United States Patent
Jörn et al.

(10) Patent No.: US 11,608,154 B2
(45) Date of Patent: Mar. 21, 2023

(54) POLYMERIC STIFFENED SHEET-LIKE COMPONENT AND PROCESS FOR PRODUCING THE SAME

(71) Applicant: Airbus Operations GmbH, Hamburg (DE)

(72) Inventors: Paul Jörn, Hamburg (DE); Remo Hinz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 421 days.

(21) Appl. No.: 16/839,355

(22) Filed: Apr. 3, 2020

(65) Prior Publication Data
US 2020/0317319 A1    Oct. 8, 2020

(30) Foreign Application Priority Data
Apr. 3, 2019    (DE) .................... 10 2019 108 769.4

(51) Int. Cl.
*B29C 65/70*    (2006.01)
*B64C 1/12*    (2006.01)
(Continued)

(52) U.S. Cl.
CPC ............ *B64C 1/12* (2013.01); *B29C 33/0038* (2013.01); *B29C 33/02* (2013.01); *B29C 33/18* (2013.01);
(Continued)

(58) Field of Classification Search
CPC ........... B64C 1/064; B64C 1/12; B29C 65/70; B29C 66/0342
See application file for complete search history.

(56) References Cited

U.S. PATENT DOCUMENTS 4,721,593 A * 1/1988 Kowal .................... B29C 70/44
                                                     264/516
6,613,258 B1    9/2003 Maison et al.
(Continued)

FOREIGN PATENT DOCUMENTS

| CN | 111791501 A | 10/2020 | |
|---|---|---|---|
| DE | 698 09 427 T2 | 9/2003 | |
| WO | WO-2018211233 A1 * | 11/2018 | ............ B29C 64/00 |

OTHER PUBLICATIONS

Radlmaier et al., "Interlaminar Fracture Toughness of Carbon Fiber Reinforced Thermoplastic In-situ Joints," AIP Conference Proceedings 1779 (2016).
(Continued)

*Primary Examiner* — Robert B Davis
(74) *Attorney, Agent, or Firm* — Jenkins, Wilson, Taylor & Hunt, P.A.

(57) ABSTRACT

A process for producing a polymeric stiffened sheet-like component, for example a panel, for aircraft construction. Production includes integration of hollow stiffening profiles, for example closed omega stringers, onto a sheet-like component, for example an external skin, where the stringers and external skin are produced from thermoplastic composite material. The stringers are integrated onto the external skin by establishing contact between the stringers and the external skin and melting thermoplastic composite material with exposure to heat and pressure at the areas of contact between external skin and stringers. Melting of the other sections of the stringers is avoided with a pressurized cooling fluid with a temperature significantly below the melting point of thermoplastic composite material, the fluid flowing through the airtight enclosed space in the stringers. Use of closed airtight (Continued)

thermoplastic omega stringers allows integration of the stringers onto the external skin in absence of any flexible tube within the stringers.

13 Claims, 6 Drawing Sheets

(51) Int. Cl.
    *B64C 1/06*     (2006.01)
    *B29C 33/00*     (2006.01)
    *B29C 33/02*     (2006.01)
    *B29C 33/18*     (2006.01)
    *B29C 35/16*     (2006.01)
    *B29K 71/00*     (2006.01)
    *B29K 105/06*     (2006.01)
    *B29K 101/12*     (2006.01)

(52) U.S. Cl.
    CPC ...... *B64C 1/064* (2013.01); *B29C 2035/1616* (2013.01); *B29K 2071/00* (2013.01); *B29K 2101/12* (2013.01); *B29K 2105/06* (2013.01); *B29K 2995/004* (2013.01)

(56) References Cited

U.S. PATENT DOCUMENTS

| | | | |
|---|---|---|---|
| 2011/0056624 A1* | 3/2011 | Gensewich | B29C 70/44 428/34.1 |
| 2013/0048213 A1* | 2/2013 | Jessrang | B29C 66/83541 156/60 |
| 2013/0092309 A1 | 4/2013 | Malasse et al. | |
| 2014/0079903 A1 | 3/2014 | Hugon et al. | |
| 2014/0186588 A1* | 7/2014 | Victorazzo | B29C 70/28 156/196 |
| 2015/0298388 A1 | 10/2015 | Wong et al. | |
| 2019/0106194 A1* | 4/2019 | Tajiri | B32B 3/28 |
| 2019/0118492 A1* | 4/2019 | Glynn | B64C 3/182 |
| 2020/0001547 A1* | 1/2020 | Douglas | B29C 65/70 |
| 2021/0253220 A1* | 8/2021 | Clark | B32B 1/00 |

OTHER PUBLICATIONS

European Search Report for Application No. 20167801.8 dated Oct. 5, 2020.
German Search Report for Application No. 10 2019 108 769.4 dated Jan. 21, 2020.

* cited by examiner

POLYMERIC STIFFENED SHEET-LIKE COMPONENT AND PROCESS FOR PRODUCING THE SAME

CROSS-REFERENCE TO RELATED APPLICATION

This application claims priority to German patent application DE 10 2019 108 769.4 filed Apr. 3, 2019, the entire disclosure of which is incorporated by reference herein.

TECHNICAL FIELD

The disclosure herein relates to a process for producing a stiffened sheet-like component made of polymer material for use in aircraft construction which comprises a sheet-like component made of polymer material and, integrated thereon, stiffening profiles made of polymer material. It further relates to the resultant stiffened sheet-like components and to the aircraft produced therewith.

BACKGROUND

Components for aircraft must have minimized weight in order to save fuel. At the same time, for safety reasons they must have high strength and stiffness. These objectives are achieved via mechanically stable materials with low density and a material-saving design, for example half-shell design.

It is known that essential segments of the fuselage of an aircraft, for example external skin, ribs and stiffening profiles such as omega stringers can be produced from the low-density metal aluminum and alloys thereof.

A further weight saving can be achieved by using thermoset composite materials, for example carbon-fiber-reinforced polymers (CFRP), in the construction of aircraft-fuselage panels. These CFRPs comprise a matrix made of thermoset polymer with carbon fibers embedded therein.

Manufacture of thermoset CFRP panels begins with production of thermoset external skin on a male mold. Thermoset stringers are then integrated onto the external skin on a female mold. For this purpose, the stringers are applied by adhesive bonding, and then the resultant CFRP panel is subjected to heat and pressure for curing and consolidation.

For stringer integration, adhesive is provided to the foot areas of consolidated omega stringers. Flexible foil tubes are placed into the enclosed space of the omega stringers. The stringers are then adhesive-bonded to the external skin. Co-consolidation of external skin and stringers, and resultant stringer integration, takes place in an autoclave. After integration, the flexible foil tubes must be removed from the enclosed space between stringer and external skin without leaving any residue. The flexible tube core technique allows consolidation of the external skin in regions including those where the stringers cover the external skin.

Materials increasingly used in aircraft construction, alongside thermoset composite materials, are thermoplastic composite materials. This situation is connected to the development of high-temperature thermoplastic materials and engineering plastics. They have high melting point, high resistance to heat and chemicals, and high strength and stiffness. Among these high-temperature thermoplastic materials are the polyaryletherketone (PAEK), for example polyetheretherketone (PEEK) and polyetherketoneketone (PEKK). They can be processed to give thermoplastic composite materials which are suitable for aircraft construction.

Omega stringers comprising thermoplastic CFRP can be integrated into an external skin comprising thermoplastic CFRP. Stringer integration is achieved with use of welding techniques rather than by adhesive bonding. Temperatures of 350 to 400° C. are necessary for this purpose.

The prior art discloses various techniques for the integration of thermoplastic stringers on a thermoplastic external skin. In the case of a first welding process, the external skin and the stiffening profiles are locally co-consolidated. In the case of a second welding process, thermoplastic polymers are joined by induction welding. Further development of these welding techniques has concentrated on replacement of local co-consolidation by global co-consolidation. For this purpose, the flexible tube core technique was further developed; in particular, work was carried out to optimize the technical capability of the flexible foil tube.

In summary, the following approaches are currently available for integration of omega stringers made of thermoplastic composite material: (1) introduction of a rigid core or a semirigid core, for example made of a silicone; (2) welding with local co-consolidation of the stringer foot; (3) introduction of a flexible tube into the omega stringer. The process is complicated.

SUMMARY

An object of the disclosure herein is to provide an improved process for producing stiffened thermoplastic sheet-like components.

The subject matter herein discloses a process to achieve this object.

Advantageous embodiments of the subject matter are disclosed herein.

According to a first aspect, the disclosure herein provides a process for producing a stiffened sheet-like component based on polymer in particular for use in aircraft construction, comprising a sheet-like component based on polymer and, secured thereon, stiffening profiles based on polymer. This process comprises at least the following steps:
  a) provision of hollow stiffening profiles which comprise thermoplastic composite material, of a sheet-like component which comprises thermoplastic composite material, of a mold and of a gastight container;
  b) arrangement of the hollow stiffening profiles and of the sheet-like component on the surface of the mold with establishment of contact, over a substantial area, between a hollow stiffening profile wall of the hollow stiffening profiles and the sheet-like component;
  c) heating of the arrangement obtained in step b), in the gastight container by pressurized heating fluid, the temperature of which is above the melting point of thermoplastic composite material, and/or in the pressurized gastight container by heating equipment which is configured within the mold and which heats at least the mold surface to a temperature above the melting point of thermoplastic composite material, with cooling of the hollow stiffening profiles by a pressurized cooling fluid which flows through the enclosed space of the hollow stiffening profiles and the temperature of which is below the melting point of thermoplastic composite material;
  d) cooling of the arrangement to ambient temperature with coherent bonding of the hollow stiffening profile walls to the sheet-like component.

The hollow stiffening profiles provided according to step a) and the sheet-like component can consist of or comprise thermoplastic composite material. However, they can also comprise thermoplastic composite material in combination with one or more other materials.

It is preferable that the hollow stiffening profiles are closed omega stringers which comprise an omega stringer with stringer top section, stringer webs and stringer feet, and comprise a covering layer bonded, in particular coherently bonded, to the stringer feet, or comprise a covering layer forming the stringer feet, where the covering layer or the covering layer and the stringer feet form(s) the hollow stiffening profile wall provided for contact with the sheet-like component over a substantial area. It is preferable that the covering layer entirely covers the surfaces of the stringer feet.

It is preferable that the step a) comprises the provision of hollow stiffening profiles and/or of a sheet-like component where these comprise a thermoplastic composite material which comprises:
  one or more thermoplastic polymers as matrix material, where these are selected from high-temperature-thermoplastic polymers, engineering plastics, semicrystalline engineering plastics, polyaryletherketones (PAEK), such as polyetherketoneketone (PEKK), polyetherketone (PEK), polyetheretherketones (PEEK), polyetheretheretherketone (PEEEK), polyetheretherketoneketone (PEEKK) and polyetherketoneetherketoneketone (PEKEKK), in particular from PEEK and PEKK, and
  a reinforcement material, preferably synthetic fibers, particularly preferably carbon fibers, where this/these has/have been embedded into the matrix material.

The melting point and glass transition temperature of polymers such as the polyaryetherketones vary depending on the chain length, the proportion and sequence of the ether groups and keto groups, and the process conditions under which the relevant PAEK has been produced. The glass transition temperature ($T_g$) of many polyaryletherketones is in the range from about 140° C. to about 170° C., their melting point ($T_f$) is in the range from about 340° C. to 380° C., and their heat distortion temperature is in a range of about 150° C. to about 180° C. An example of a long-term service temperature stated in the literature for polyaryletherketones is 250° C.

It is preferable that step a) comprises provision of the sheet-like component in the unconsolidated state and of the hollow stiffening profiles in the consolidated state.

It is preferable that step a) comprises provision of a mold, in particular male mold with cavities to receive the hollow stiffening profiles.

It is preferable that step a) comprises provision of a mold, in particular male mold with cavities to receive the hollow stiffening profiles and with a hollow-stiffening-profile-cooling unit configured adjacent to the cavities.

It is preferable that step a) comprises provision of a male mold with a convexly shaped surface region for lay-up of the sheet-like component.

It is preferable that step a) comprises provision of a female mold with a concavely shaped surface region for lay-up of the sheet-like component.

It is preferable that step a) comprises provision of a mold, in particular female mold, with heating equipment for heating the arrangement laid-up on the mold and made of sheet-like component and of hollow stiffening profiles.

It is preferable that step a) comprises provision of an autoclave or pressure autoclave as gastight container.

It is preferable that step a) comprises provision of hollow stiffening profiles, the terminal sections of which are configured so as to have the function of rivets for securing the hollow stiffening profiles on the sheet-like component.

It is preferable that step b) comprises arrangement of the hollow stiffening profiles in the cavities of the mold and lay-up of the sheet-like component on the surface of the mold.

It is preferable that step b) comprises arrangement of the sheet-like component on the surface of the mold and positioning of the hollow stiffening profiles on the surface of the sheet-like component.

It is preferable that step b) comprises establishment of contact between the surface of the covering layer and the surface of the sheet-like component.

It is preferable that step c) comprises use of air or of an inert gas as heating fluid and/or as cooling fluid.

It is preferable that step c) comprises use of a heating fluid and/or of a heated mold with a temperature that is at least 10° C. above the melting point of thermoplastic composite material and/or of a cooling fluid with a temperature that is at least 50° C. below the melting point of thermoplastic composite material.

It is preferable that step c) comprises use of a heating fluid and/or of a heated mold with a temperature of about 5° C. to about 120° C., preferably about 10° C. to about 100° C., more preferably about 10° C. to about 80° C., particularly preferably about 10° C. to about 60° C. above the melting point of thermoplastic composite material, and of a cooling fluid (40) with a temperature of about 50° C. to about 250° C., preferably about 60° C. to about 180° C., more preferably about 70° C. to about 160° C., particularly preferably about 90° C. to about 140° C. below the melting point of thermoplastic composite material.

The cooling fluid can by way of example also have a temperature approximately equal to room temperature or ambient temperature if the other process conditions, for example physical state of cooling fluid and heating fluid and temperature of the heating fluid ensure that in the region of contact between hollow stiffening profile wall of the hollow stiffening profiles and sheet-like component the temperature prevailing is sufficiently high to provide coherent bonding of these components via melting or softening and subsequent cooling.

The person skilled in the art will select the temperature of the heating fluid to be just above the melting point of thermoplastic composite material, and the temperature of the cooling fluid to be significantly below the melting point of thermoplastic composite material, so that thermoplastic polymer in thermoplastic composite material melts and/or plastifies and/or softens at the area of contact between the hollow stiffening profiles and the sheet-like component and does not melt and/or does not soften and/or remains elastic and/or remains dimensionally stable in the other sections of the hollow stiffening profiles.

When PEEK is used, the temperature of the heating fluid can by way of example be about 350° C. to about 400° C. and/or the temperature of the cooling fluid can be about 200° C. to about 250° C. The temperature of the cooling fluid can preferably also be about 150° C., and therefore in the region of the heat-distortion temperature of PEEK. The temperature of the cooling fluid can particularly preferably be about 140° C., and therefore in the region of the glass transition temperature of PEEK.

In the case of PEEK, and of the other engineering plastics, the temperature of the cooling fluid can preferably be a temperature sufficiently low to keep the temperature of the components to be cooled of the hollow stiffening profiles below the heat-distortion temperature and in particular below the glass transition temperature.

It is preferable that step c) comprises use of a heating fluid and/or of a heated mold in combination with a cooling fluid, the temperature of which is selected in a manner such that the sheet-like component and the hollow stiffening profile wall, in particular only the side of the hollow stiffening profile wall that adjoins the sheet-like component, are heated above the melting point of thermoplastic composite material, and the other sections of the hollow stiffening profiles remain at a temperature below the melting point of thermoplastic composite material.

It is preferable that step c) comprises use of a heating fluid and/or of a heated mold in combination with a cooling fluid, the temperature of which is selected in a manner such that the hollow stiffening profile wall and the sheet-like component can be coherently bonded to one another after cooling and/or the other sections of the hollow stiffening profiles remain dimensionally stable and/or the hollow stiffening profiles remain airtight.

It is preferable that step c) comprises generation of a pressure $p_A$ in the range of about 2 to 40 bar, preferably about 5 to 20 bar, in particular about 8 to 12 bar, by generation of pressure within the gastight container and/or by an external pressure-generation system.

It is preferable that step c) comprises generation of a superatmospheric pressure in the hollow stiffening profiles, where the hollow stiffening profile wall of the hollow stiffening profile or the covering layer of the closed omega stringers complies precisely with the desired surface shape of the aircraft component.

It is preferable that step c) comprises the generation of a superatmospheric pressure in the gap optionally present between the cavities and the hollow stiffening profiles laid-up into the cavities.

It is preferable that the cooling of the hollow stiffening profiles in step c) comprise introduction of heating fluid from the gastight container into a fluid line A configured in the male mold and equipped with a fluid cooling unit A for cooling of the heating fluid, and introduction of the resultant cooling fluid into the enclosed space in the hollow stiffening profiles (method A in FIG. 3).

It is preferable that the cooling of the hollow stiffening profiles in step c) comprises conducting heating fluid out of the gastight container into an external fluid line B equipped with a fluid cooling unit B for cooling of the heating fluid, and introduction of the resultant cooling fluid into the gastight container and then into the enclosed space in the hollow stiffening profiles (method B in FIG. 3 and FIG. 5).

It is preferable that the cooling of the hollow stiffening profiles in step c) comprises production of pressurized cooling fluid outside of the gastight container in a separate pressure-generation system and/or by a pump, and introduction of the cooling fluid through a fluid line C into the gastight container and then into the enclosed space in the hollow stiffening profiles (method C in FIG. 3 and FIG. 5).

It is preferable that step c) comprises use of a cooled insulated flexible or inflexible tube for introduction of the pressurized cooling fluid into the enclosed space.

It is preferable that step c) comprises introduction of the pressurized cooling fluid into the enclosed space through a terminal aperture of the hollow stiffening profiles and/or through one or more apertures in a web of the closed omega stringers, in particular with use of an inlet valve.

It is preferable that step c) comprises cooling, by a fluid cooling unit C within the gastight container, of the cooling fluid introduced from outside of the gastight container.

It is preferable that step c) comprises introduction of pressurized cooling fluid in the gap optionally present between the cavities and the hollow stiffening profiles laid-up into the cavities.

It is preferable that step d) comprises cooling of the arrangement by allowing cooling in contact with the ambient air.

It is preferable that step d) comprises cooling of the arrangement by active cooling with a cooling medium.

It is preferable that step d) comprises cooling by active cooling and/or allowing cooling of the arrangement with maintenance of the joining pressure prevailing in the gastight container until the temperature of the arrangement is below the temperature required for the cohesive bond, particularly below the long-term service temperature, preferably below the heat-distortion temperature, particularly preferably below the glass transition temperature of thermoplastic composite material.

It is preferable that the hollow stiffening profiles in the cavities of the mold are cooled by a cooling medium which flows through the hollow-stiffening-profile-cooling unit configured adjacent to the cavities in the mold.

It is preferable that a vacuum foil is laid-up on the arrangement made of hollow stiffening profiles and of sheet-like component, and then a vacuum is generated between the vacuum foil and the surface of the mold and/or the surface of the sheet-like component and/or the surface of the hollow stiffening profiles.

According to a second aspect, the disclosure herein provides a closed omega stringer which in particular is intended for use for producing a stiffened sheet-like component. It comprises an omega stringer with stringer top section, stringer webs and stringer feet and comprises a covering layer coherently bonded to the stringer feet, where the omega stringer and the covering layer comprise a thermoplastic composite material, and where the covering layer is intended for contact with the sheet-like component over a substantial area.

The closed omega stringer can be produced by welding of the feet of the open omega stringer to the covering layer, or as a one-piece component by pultrusion.

According to a third aspect, the disclosure herein provides a stiffened sheet-like component, for example an aircraft shell, a fuselage shell or a panel, which is obtainable by a process described at an earlier stage above and/or which comprises the closed omega stringers described at an earlier stage above where these have been coherently bonded at their covering layer, in particular on the surface of their covering layer, to a sheet-like component which comprises a thermoplastic composite material.

According to a fourth aspect, the disclosure herein provides an aircraft which comprises the closed omega stringers described at an earlier stage above or comprises one or more of the stiffened sheet-like components described above.

According to a fifth aspect, the disclosure herein provides a device for carrying out the process described at an earlier stage above or for producing the stiffened sheet-like component described at an earlier stage above:

a) a mold, in particular male mold or female mold, with a surface for arrangement of hollow stiffening profiles and of a sheet-like component, where these comprise a thermoplastic composite material;

b) a mold equipped with a heating device for heating the arrangement made of hollow stiffening profiles and of sheet-like component;

c) a gastight container for heating the arrangement made of hollow stiffening profiles and of sheet-like component under superatmospheric pressure;

d) cooling equipment comprising the following for cooling the hollow stiffening profiles:

within the male mold, a line which connects the space within the gastight container to the enclosed space in the hollow stiffening profiles and is equipped with a fluid cooling system, in particular fluid cooling lines for introduction and cooling of heating fluid and for conducting the resultant cooling fluid onwards into the enclosed space of the hollow stiffening profiles; and/or a line which leads out of the gastight container and is equipped with a fluid cooling system, in particular fluid cooling channels, for extraction and cooling of heating fluid, and a line for return into the gastight container for introducing the resultant cooling fluid into the enclosed space in the hollow stiffening profiles; and/or an external pressure-generation device, for provision of pressurized cooling fluid outside of the gastight container, and lines for introducing the resultant cooling fluid into the enclosed space of the hollow stiffening profile a fluid cooling unit C within the gastight container for cooling of the cooling fluid (40) introduced by the fluid line B and, respectively, the fluid line C.

It is preferable that the mold comprises cavities to receive the hollow stiffening profiles, with optionally, configured adjacent to the cavities, a cooling unit for cooling of the hollow stiffening profiles by a cooling fluid.

BRIEF DESCRIPTION OF THE DRAWINGS

Inventive examples are explained in more detail below with reference to the attached drawings, where.

DETAILED DESCRIPTION

Figure 1:
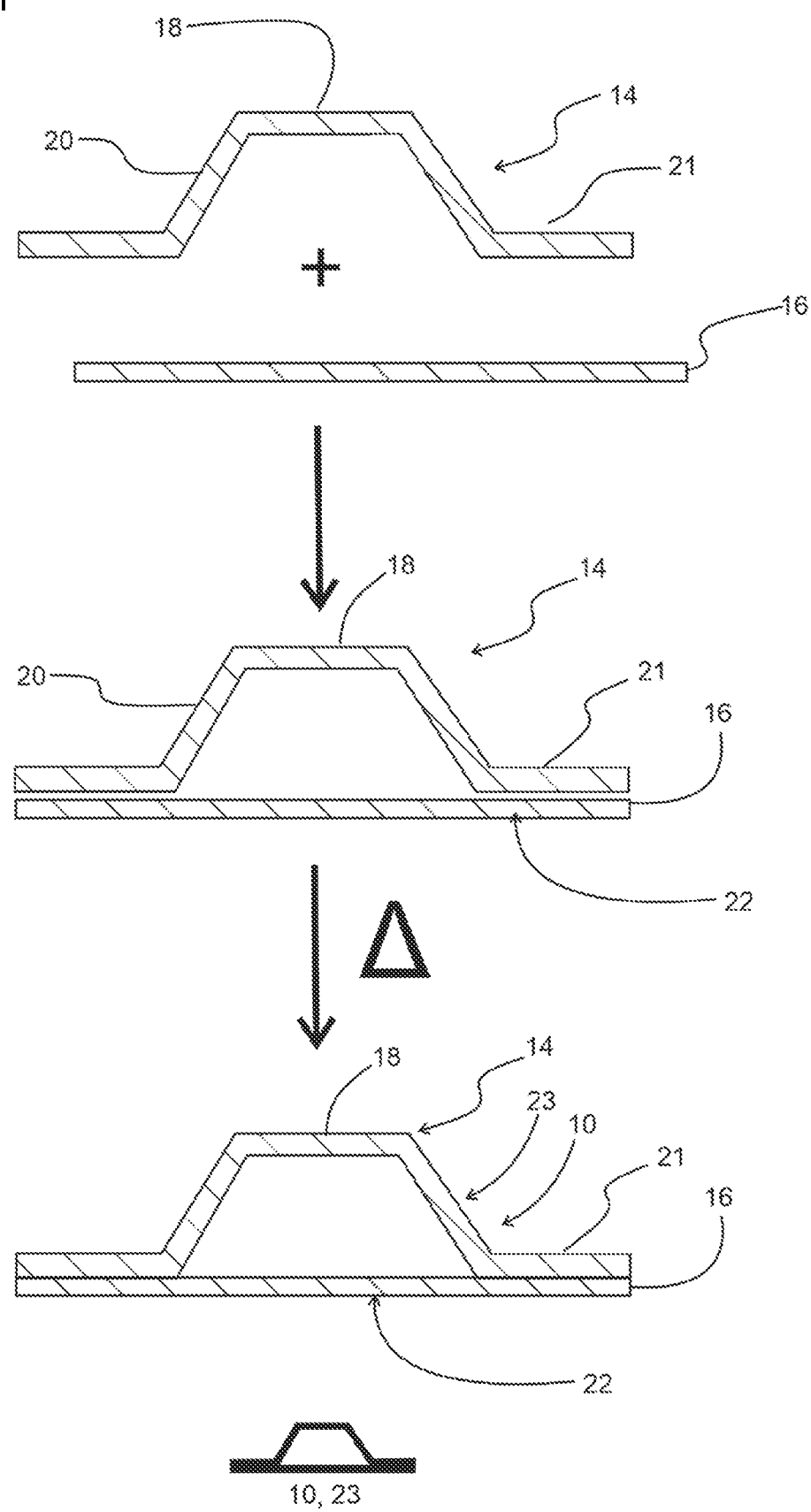
FIG. 1 shows a schematic diagram of a cross section of the production of a hollow stiffening profile.

The production of a stiffened sheet-like component 12, made of a sheet-like component 32 and of hollow stiffening profiles 10, is described below. The process depicted relates by way of example to the production of a fuselage shell 12 made of an external skin 34 and of closed omega stringers 23. All components by way of example consist of or comprise a thermoplastic composite material made of polyetheretherketone (PEEK) with a melting point of about 340° C. and carbon fibers.

FIG. 1 shows a schematic diagram depicting, in cross section, the structure and production of a closed omega stringer 23. The closed omega stringer 23 comprises an omega stringer 14 which has a top section 18, two webs 20 and two feet 21, and also comprises a covering layer 16 which closes the omega stringer 14 at its feet 21.

The covering layer 16 and the two feet 21 of the omega stringer 14 are brought into contact with one another, and by way of example are bonded coherently to one another by heating at least of the areas of contact between feet 21 and covering layer 16. This gives a closed omega stringer 23 which, with closed stringer ends, is airtight and can be pressurized.

The cover layer 16 forms the hollow stiffening profile wall 22 of the closed omega stringer 23; for the production of the fuselage shell, this wall is brought into contact with the external skin 34 over a substantial surface area and is then coherently bonded thereto.

Figure 2:
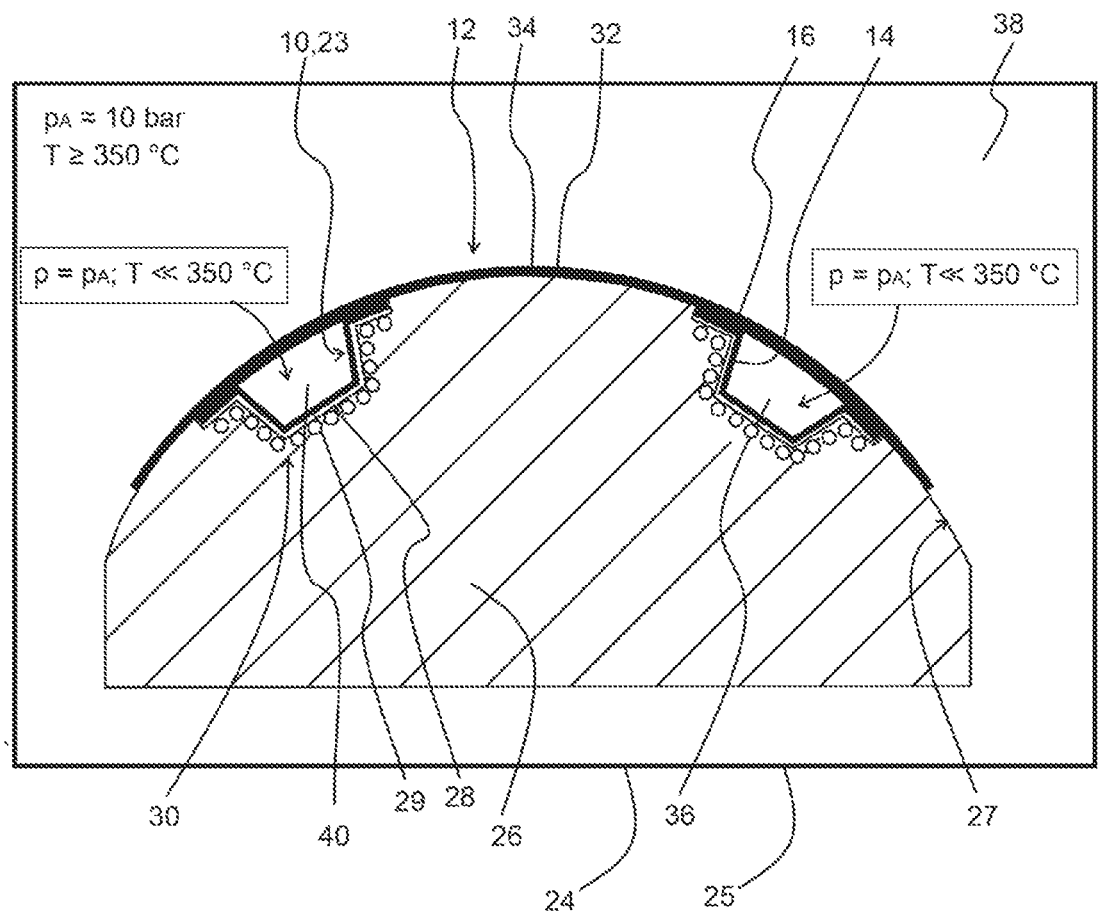
FIG. 2 shows a device for carrying out the process of the disclosure herein with use of a male mold.

FIG. 2 illustrates an Inventive Example of the conduct of the process for producing a fuselage shell made of an external skin 34 and closed omega stringers 23 in a device using a male mold 26.

The male mold 26 has cavities 28 for positioning the closed omega stringers 23.

Below the cavities 28 there is arranged here by way of example a hollow-stiffening-profile-cooling unit 30 for additional cooling of the closed omega stringers 23; the unit comprises by way of example cooling lines through which a cooling medium flows.

It is also possible, however, that the cavities 28 have insulation, for example in the form of a polytetrafluoroethylene coating or ceramic coating which insulates the cooled enclosed space 36 and the cooled cavities 28 thermally from the remainder of the heated male mold 26.

The closed omega stringers 23 are positioned in the cavities 28; the surface of the covering layer 16 of the closed omega stringers 23 here is approximately flush with the convex surface 27 of the male mold 26. The drawing is not to scale, and shows the closed omega stringers 23 in enlarged depiction. An external skin 34 is laid-upon the convex surface 27 of the male mold 26 in a manner such that the surface of the covering layer 16 comes into intimate contact with the surface of the external skin 34 over a substantial area. The external skin 34 can be consolidated or not consolidated.

The arrangement made of closed omega stringers 23 and external skin 34 is then heated in a gastight container 24 with a heating device, for example an autoclave 25. The autoclave 25 is placed under a superatmospheric pressure p of by way of example about 2 to 40 bar, here by way of example about 10 bar. The heating fluid 38 in the space within the autoclave 25 is by way of example heated compressed air, and has a temperature of by way of example 350° C. The temperature can therefore be about 10° C. above the melting point of PEEK or higher.

It is advantageous to control the temperature of the process in a manner such that only the external skin 34 and the side of the stringer feet 21 or of the covering layer 16 of the closed omega stringers 23 that faces towards the external skin 34 are heated above the melting point of PEEK. This principle is also applied in the case of other thermoplastics. In order to protect the remaining sections of the closed omega stringers 23 from melting that destabilizes the shape of the stringers, a cooling fluid 40 which cools the closed omega stringers 23 from inside flows through the elongated enclosed space 36 in the closed omega stringers 23.

Figure 3:
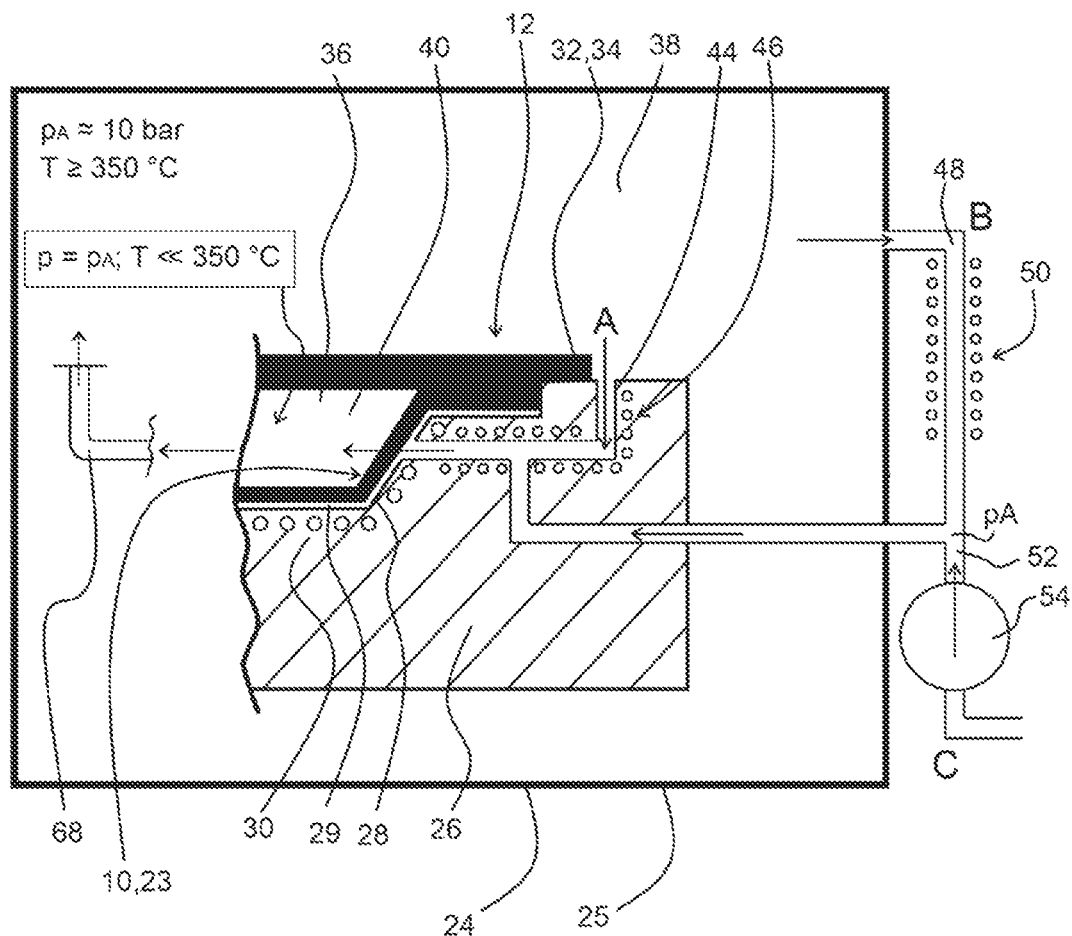
FIG. 3 shows an enlarged detail of the device of FIG. 2 intended to illustrate the cooling of the hollow stiffening profiles.

The cooling fluid 40 has a temperature below the melting point of PEEK, preferably significantly below the melting point, for example below the long-term service temperature, below the heat distortion temperature or below the glass transition temperature of PEEK. Its temperature is significantly below 350° C. (T>>350° C.), and can in particular be at least 50° C. or even more significantly below the melting point of PEEK. The cooling fluid 40 in the enclosed space 36 is subject to a pressure of by way of example about 10 bar and likewise here consists of or comprises compressed air. The cooling fluid 40 is produced inside and/or outside of the autoclave 25, for example from the heating fluid 38. FIG. 3 illustrates details relating to production and introduction of the cooling fluid 40.

For further protection from melting of particular component sections, the closed omega stringers 23 can moreover be cooled from outside by a cooling medium which flows through the hollow-stiffening-profile-cooling unit 30 in the male mold 26.

A gap 29 can develop between the cavities 28 and the closed omega stringers 23. This gap 29 is optionally likewise subjected to the same superatmospheric pressure as the space within the autoclave 25. It can moreover be filled with pressurized cooling medium. However, it can also be placed under vacuum.

In summary, the objective in selection of the fluid temperatures of heating fluid 38 and cooling fluid 40 is that the external skin 34 and, as far as possible, only the side of the stringer feet or of the covering layer that is oriented towards the external skin 34 is heated by the heating fluid 38 to a temperature above the melting point of PEEK. PEEK softens or melts at the area of contact between external skin 34 and the side of the stringer feet or the exterior side of the covering layer. Cooling produces a mechanically stable, preferably coherent bond between the external skin 34 and the closed omega stringers 23. An external skin 34 that is not consolidated becomes consolidated under the selected pressure conditions and temperature conditions. The closed omega stringers 23 and external skin 34 are co-consolidated. The pressurized stringer is airtight and stable. Within the stringer there is no flexible tube.

The cooling fluid 40 in the enclosed space 36 of the closed omega stringer 23, and optionally the cooling medium in the hollow-stiffening profile-cooling unit 30, ensure that, at least in the region of the stringer top section 18 and of the stringer webs 20, the closed omega stringers 23 are restricted to a temperature below the melting point of PEEK. The closed omega stringers 23 do not soften, and remain dimensionally stable. There is no requirement for the insertion of supportive elements, for example of a rigid or semirigid core, into the enclosed space 36 of the closed omega stringers 23 in order to stabilize the closed omega stringers 23. Complicated removal of such supportive elements is likewise not required.

FIG. 3 shows an enlarged detail of the device of FIG. 2. It illustrates methods A, B and C for cooling of the closed omega stringers 23.

Configured in the male mold 26 for the method A there is a fluid line A, 44, which connects the space within the autoclave 25 to the enclosed space 36 in the closed omega stringers 23. The fluid line A 44 is equipped with a fluid-cooling unit A, 46, by way of example made of cooling channels or cooling lines, which cools the inflowing heating fluid 38. The resultant cooling fluid 40 is introduced into the enclosed space 36 of the closed omega stringers 23. It is subject to the same pressure as the heating fluid 38, for example about 10 bar, but has a lower temperature of $T \leq \leq 350°$ C.

In the method B, heating fluid 38 flows out of the gastight autoclave 25 through a fluid line B, 48. Outside of the autoclave 25, the fluid line B, 48 has a fluid-cooling unit B, 50 for cooling of the heating fluid 38. The resultant cooling fluid 40 is introduced by the fluid line B, 48 into the enclosed space 36 in the closed omega stringers 23. It is subject to the same pressure as the heating fluid 38, of about 10 bar, but has a lower temperature of $T >> 350°$ C.

In the method C, the pressurized cooling fluid 40 is formed separately from the heating fluid 38. It is produced outside of the autoclave 25 in a separate pressure-generating system, and is conducted by the fluid line C, 52 into the enclosed space 36 in the closed omega stringers 23. The cooling fluid 40 is formed or conveyed by a pump 54 integrated in the fluid line C, 52. The pressure of the cooling fluid 40 corresponds approximately to the pressure of the heating fluid 38.

FIG. 3 shows a combination of the methods A, B and C. However, it is also possible to combine only the methods A and B or A and C or B and C, or to implement exclusively the method A or the method B or the method C, in order to provide the cooling fluid 40 for the enclosed space 36.

The pressurized cooling fluid 40 is introduced into the enclosed space 36 through an aperture at the end of the hollow stiffening profiles 10, 23, or through one or more apertures in a surface of the hollow stiffening profiles 10, 23, in particular in a web 20. For the introduction procedure, the hollow stiffening profiles 10, 23 can have a fixedly installed valve or a releasably secured valve. It is possible by way of example to use the stringer outflow apertures for this purpose. After flowing through the enclosed space 36, the cooling fluid 40 is by way of example discharged at an outlet aperture 68 into the space within the autoclave 25.

Figure 4:
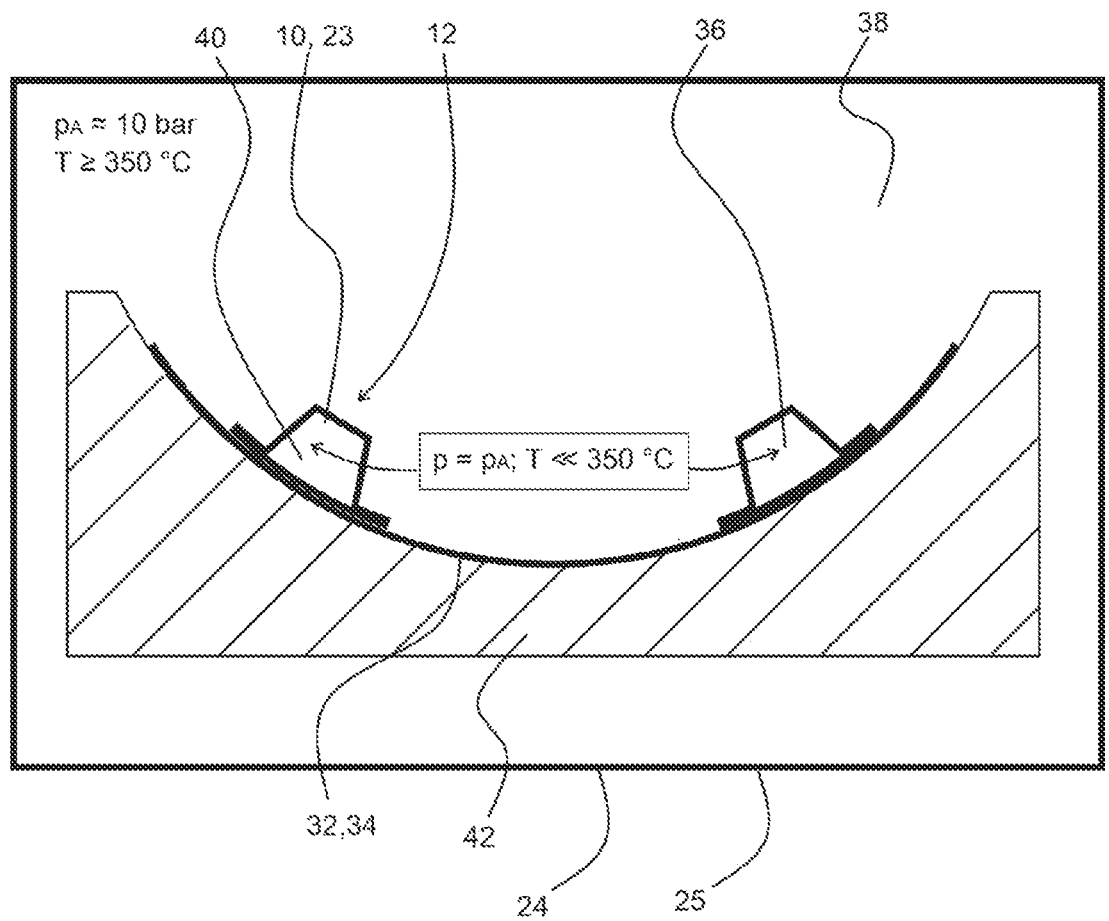
FIG. 4 shows a device for carrying out the process of the disclosure herein with use of a female mold.

FIG. 4 illustrates the conduct of the process of the disclosure herein for producing a fuselage shell 12 made of an external skin 34 as example of a sheet-like component 32 and closed omega stringers 23 as example of hollow stiffening profiles 10 in a device with a female mold 42.

The external skin 34 is laid-upon the concave surface of the female mold 42. The closed omega stringers 23 are positioned thereon. The components consist of or comprise a thermoplastic composite material made of a PEEK matrix with embedded carbon fibers. The process using female mold is identical in various aspects with the process using male mold 26. To this extent, reference is made to the description of the process of FIG. 2.

Unlike in the process, the female mold 42 has no cavities 28 and no hollow-stiffening-profile-cooling unit 30 that assists the cooling of the closed omega stringers 23. In order that the closed omega stringers 23 remain dimensionally stable, more cooling can be applied to the enclosed space 36 in the closed omega stringers 23. A possible result of the cooling in the enclosed space 36 is that the covering layer 16 melts to a greater degree in the edge region by the stringer feet 21 and forms a coherent bond to the stringer feet 21, because this region is in direct contact with the heating fluid 38 in the autoclave 25.

The female mold 42 comprises (not depicted) heating equipment, which is preferably arranged in the vicinity of the concave surface of the mold 42, and which is intended for heating of the external skin 34 and closed omega stringers 23 laid-upon the concave surface. In this case, the heating capacity required for the coherent bonding can be supplied by the heating equipment in the mold 42 or can be combined with the heating capacity of a heating fluid 38 in the gastight container 24, 25.

Figure 5:
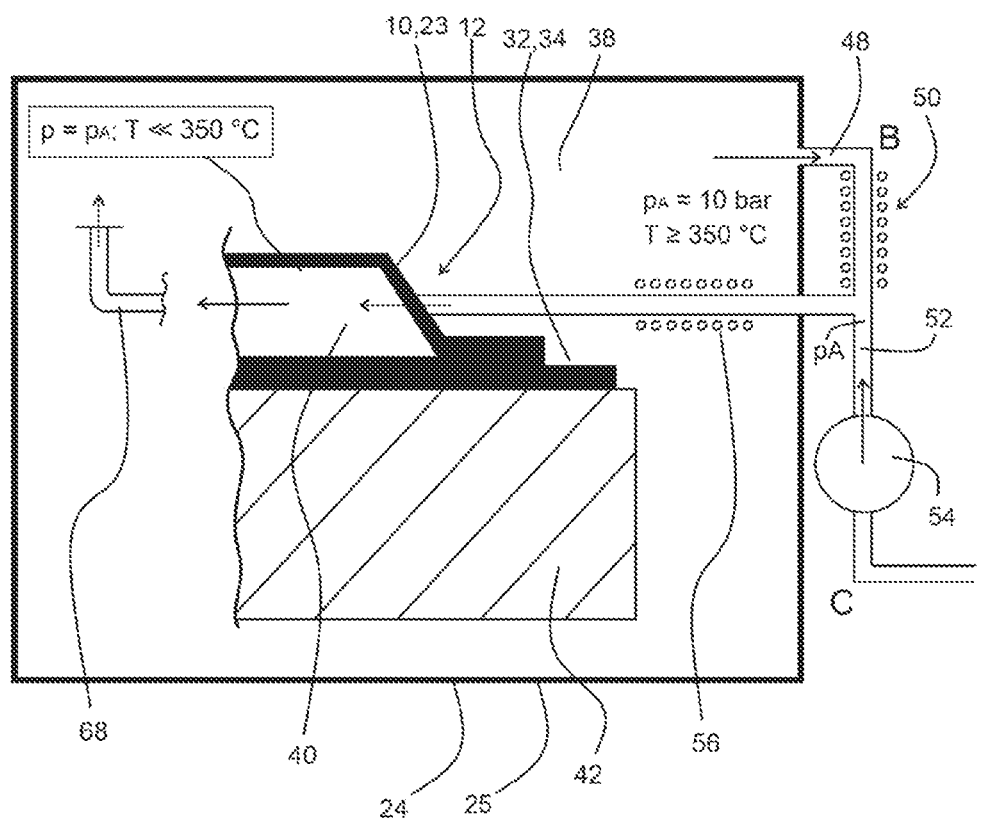
FIG. 5 shows an enlarged detail of the device of FIG. 4 intended to illustrate the cooling of the hollow stiffening profiles.

FIG. 5 shows an enlarged detail of the device with female mold 42 from FIG. 4, illustrating methods B and C for cooling of the closed omega stringers 23. The methods B and C depicted here in essence correspond to the methods B and C implemented with the male mold 26 (see FIG. 3), an exception being that even when the fluid lines B, 48 and C, 50 are within the autoclave 25 they run outside of the mold 42.

As shown in FIG. 5, the cooling medium introduced in the methods B and C from outside into the autoclave 25 can be further cooled by a further fluid cooling unit C, 56 within the autoclave 25. A cooling unit C, 56 of this type can also be provided (not depicted) in the case of the device shown in FIG. 3 with male mold 26.

The cooling methods B and C can be combined with one another. However, they can also be implemented individually and independently of one another.

The pressurized cooling fluid 40 is introduced into the enclosed space 36 through an aperture at the end of the hollow stiffening profiles 10, 23 or through one or more apertures in a surface of the hollow stiffening profiles 10, 23, in particular in a web 20. For the introduction procedure, the hollow stiffening profiles 10, 23 can have a fixedly installed valve or a releasably secured valve. It is possible by way of example to use the stringer outflow apertures for this purpose. After flowing through the enclosed space 36, the cooling fluid 40 is by way of example discharged at an outlet aperture 68 into the space within the autoclave 25.

Figure 6:
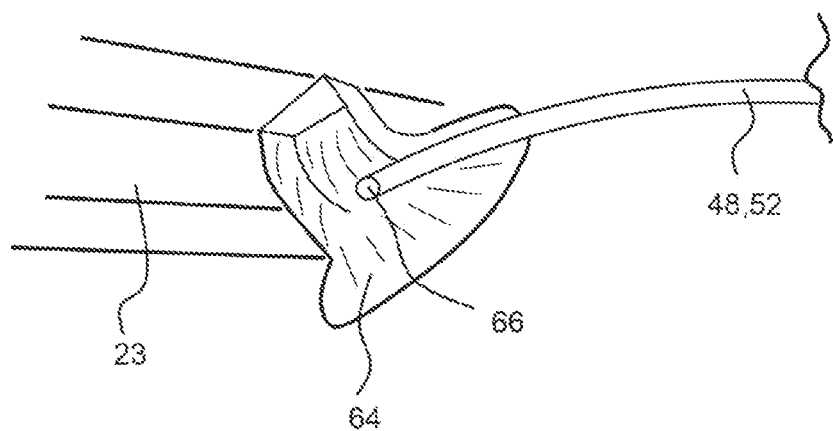
FIG. 6 shows the connection of a line with pressurized cooling fluid to a hollow stiffening profile.

FIG. 6 illustrates the connection of a flexible or inflexible tube comprising the pressurized cooling fluid 40 to a closed omega stringer 23 in essence for the process with female mold 42. The flexible or inflexible tube can be a terminal section of the fluid line B, 48 or of the fluid line C, 52. At the end of the closed omega stringer 23 there is a closure cap 64 inserted into the stringer 23. The closure cap 64 is installed before consolidation. It can be installed on the stringer before stringer integration. It is combined with an inlet valve 66.

The stringer end can be provided with a stringer outlet which is made of CFRP and which remains in the stringer. The CFRP material can have a higher melting point than the CFRP material of the stringer 23. In the case of particularly powerful cooling, the same matrix system can be used. This stringer outlet can be configured as rivet for bonding of the stringer on the external skin. It is thus possible to omit use of other rivets for securing the stringer end. For this purpose, the outlet cap can be produced with greater size and from a stiffer material.

Various aspects of the disclosure herein are summarized below.

In principle, consolidation can be achieved by using an autoclave together with the sleeve/flexible tube within the stringer, where this has connection to the pressure in the autoclave. However, this approach continues to incur some cost relating to design of the mold (stabilization of the molten omega stringer). The sleeves/flexible tubes are moreover rather expensive. The process of the prior art therefore incurs high cost.

The disclosure herein consists in or comprises integration of a thermoplastic omega stringer onto a thermoplastic skin (for a high-temperature matrix, for example PEKK/PEEK) by an autoclave process without any major demands relating to the design of the mold and without use of a sleeve or flexible tube, where nevertheless an internal pressure is maintained within the hollow omega profile. For this purpose, the omega profile is to be produced in a form that is closed (covering layer over the feet) and is not to be heated in its entirety (is to be cooled).

The end of the stringer allows entry into the hollow profile of the pressure prevailing in the autoclave.

The design of the end of the profile can also be such that it acts as a redundant rivet element, a DT feature, which prevents complete breakaway of the stringer in the event of damage if the end region of the stringer is suddenly subjected to high loading.

It is not essential that the pressure that enters into the hollow profile derives from an autoclave; it can also come from a separate pressure-generation system. A cooling medium can also be involved here.

FIG. 2 and FIG. 3 show an autoclave with a male mold. The previously consolidated closed thermoplastic stringer profiles are arranged in the male mold. The stringer has a basal covering layer which covers, or provides covering over, both stringer feet. This layer completely closes the stringer and converts it to a closed, airtight stringer. This stringer can then be internally pressurized, without use of a flexible tube or a sleeve as required in the processes of the prior art. This has the following attendant advantages:

lower costs, because there is no requirement to use a flexible tube;

flexible tubes for high-temperature thermoplastic materials are expensive;

there is no requirement for withdrawal of a flexible tube after production.

Thermoplastic external skin is arranged over the stringers. It can be consolidated or not consolidated.

The interior of the closed stringer, e.g. closed omega stringer, can be pressurized, preferably with relatively cool compressed air (temperature by way of example 200-250° C.). The compressed air in the stringer is introduced into the stringer through an inlet (e.g. an inlet valve). The following possibilities are available for producing the relatively cool air (FIG. 3):

A) use of hot air from the autoclave, which is cooled when it enters into the mold;

B) removal of hot air from the autoclave, cooling of the hot air outside of the autoclave and use of a cooled or insulated flexible or inflexible tube for returning the cooled air into the hollow stringer;

C) use of a pump outside of the autoclave or of a compressed air reservoir outside of the autoclave with cooled air for applying pressure to the stringer.

These cooling methods A to C can also be combined with one another. In the case of a male mold, it is moreover advantageously possible to cool the mold surrounding the stringer.

If the pressure prevailing in the stringer is the same as in the autoclave, but the stringer is cooled to a temperature significantly below the melting point, it can remain stable and airtight.

Only the skin and the side of the stringer foot that is directed towards the skin are heated to a temperature above the melting point (e.g. 350-400° C. for PEEK or PEKK). The skin is thus consolidated, and the stringer is integrated onto the skin by co-consolidation. There is no requirement for removal of a flexible tube on demolding.

Because of the good pressure within the stringer profile, the stringer foot can comply precisely with the intended loft shape of the aircraft. In the process with male mold, a press sheet can be used externally on the skin in order to improve the quality of the exterior loft surface.

FIG. 4 and FIG. 5 show the concept for a female mold. The principle applied in this process is the same as for the male mold, but this process is more demanding because a solution must be found for the following problem:

The stringer must remain stable (good cooling is required), because it is neither supported by nor cooled by the mold; additional mold blocks can be used, but they would incur greater cost; increased cooling of the stringer can be helpful.

The stringer foot covering layer can generally lead to a slight increase of weight, because this covering layer is not normally necessary. However, the effects resulting from the weight can be ameliorated, because the relatively thick stringer foot reduces the risk of buckling of the skin under the stringer head, and buckling resistance is increased. A slight increase of stringer slope angle is a possibility.

FIG. 6 shows the option in essence for the process with female mold for the combination of the pressure inlet with 1) a closure cap combined with an inlet valve as part of the mold design; the cap is installed before consolidation and is connected to the flexible compressed-gas tube. It could also comprise an additional possibility for cooling: it could by way of example be installed onto the stringer before stringer integration and could connect the vacuum film in a manner broadly similar to that used for the A350, but without any flexible tube in the stringer;

2) a stringer outlet made of CFRP: provision of a CFRP element that remains within the structural component. Use of a compatible thermoplastic material with relatively high melting point (e.g. with a boundary layer), with appropriate cooling, allows use of the same matrix system. This stringer-outlet component can provide the function of a "redundant rivet". It can allow omission of rivets used to avoid breakaway of the stringer near the stringer outlet. This can be realized via greater width and a cap design optimized in relation to stiffness.

Not shown in the figures: the flexible compressed-air tube with the airstream that serves for cooling can also be connected directly to the stringer web, with a fixedly installed valve or a releasably secured valve, e.g. with use of stringer outflow holes.

Preferred features for the male mold (no figure): for double-curved shells (or shells with a relatively large angle), demolding is a factor requiring attention. Consideration can be given to additional mold cores which run along the stringer. The mold core can be arranged together with the stringer or in a preliminary procedure. These cores can allow demolding in the case of double-curved areas and of a panel with a spread or a bend of up to 180°. The cooling can be implemented within the mold core, or the cooling medium can pass through the molds. Even when the entire length is covered, the mold can be the "cooling channel". Preferred features for the female mold (no figure): it is also possible to provide supportive mold blocks outside of the stringer under the vacuum foil.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A process for producing a stiffened sheet-like component based on polymer for use in aircraft construction, the stiffened sheet-like component comprising a sheet-like component based on polymer and, secured thereon, stiffening profiles based on polymer, the process comprising at least steps of:
   a) providing hollow stiffening profiles which comprise thermoplastic composite material, of a sheet-like component which comprises thermoplastic composite material, of a mold and of a gastight container;
   b) arranging the hollow stiffening profiles and of the sheet-like component on a surface of the mold with establishment of contact, over a substantial area, between a hollow stiffening profile wall of the hollow stiffening profiles and the sheet-like component;
   c) heating the arrangement obtained in step b), in the gastight container by pressurized heating fluid, a temperature of which is above a melting point of thermoplastic composite material, and/or in the pressurized gastight container by heating equipment which is configured within the mold and which heats at least the mold surface to a temperature above the melting point of thermoplastic composite material, with cooling of the hollow stiffening profiles by a pressurized cooling fluid which flows through an enclosed space of the hollow stiffening profiles and a temperature of which is below the melting point of thermoplastic composite material;
   d) cooling of the arrangement to ambient temperature with coherent bonding of the hollow stiffening profile walls to the sheet-like component.

2. The process according to claim 1, wherein the hollow stiffening profiles are closed omega stringers which comprise an omega stringer with stringer top section, stringer webs and stringer feet, and comprise a covering layer bonded, coherently bonded, to the stringer feet, or comprise a covering layer forming the stringer feet, where the covering layer or the stringer feet form(s) the hollow stiffening profile wall provided for contact with the sheet-like component over a substantial area.

3. The process according to claim 1, wherein step a) comprises one, a plurality or all of steps of:
   a1) providing hollow stiffening profiles and/or of a sheet-like component, where these comprise a thermoplastic composite material which comprises:
   one or more thermoplastic polymers as matrix material, where these are selected from the group consisting of high-temperature-thermoplastic polymers, engineering plastics, semicrystalline engineering plastics, and polyaryletherketones; and
   a reinforcement material, comprising synthetic fibers, or synthetic fibers that are carbon fibers, where the reinforcement material is embedded into the matrix material; and/or
   a2) providing a mold that can be a male mold with cavities to receive the hollow stiffening profiles; and/or
   a3) providing a mold that can be a male mold with cavities to receive the hollow stiffening profiles and with a hollow-stiffening-profile-cooling unit which is configured adjacent to the cavities in the mold; and/or
   a4) providing a male mold with a convexly shaped surface region for lay-up of the sheet-like component; and/or
   a5) providing a female mold with a concavely shaped surface region for lay-up of the sheet-like component; and/or
   a6) providing a mold that can be a female mold with heating equipment for heating the arrangement laid-up on the mold and made of sheet-like component and of hollow stiffening profiles; and/or a7) providing an autoclave or pressure autoclave as gastight container.

4. The process according to claim 1, wherein step b) comprises one, a plurality or all of steps of:

b1) arranging the hollow stiffening profiles in the cavities of the mold and lay-up of the sheet-like component on the surface of the mold; and/or b2) arranging the sheet-like component on the surface of the mold and positioning of the hollow stiffening profiles on a surface of the sheet-like component; and/or b3) establishing contact between a surface of the covering layer of the closed omega stringers and the surface of the sheet-like component.

5. The process according to claim 1,
wherein step c) comprises one, a plurality or all of steps of:

c1) using air or of an inert gas as heating fluid and/or as cooling fluid; and/or c2) using a heating fluid and/or of a heated mold with a temperature that is at least about 10° C. above the melting point of thermoplastic composite material, and/or of a cooling fluid with a temperature that is at least about 50° C. below the melting point of thermoplastic composite material; and/or c3) using a heating fluid and/or of a heated mold with a temperature of about 5° C. to about 120° C., or about 10° C. to about 100° C., or about 10° C. to about 80° C., or about 10° C. to about 60° C. above the melting point of thermoplastic composite material, and a cooling fluid with a temperature of about 50° C. to about 250° C., or about 60° C. to about 180° C., or about 70° C. to about 160° C., or about 90° C. to about 140° C. below the melting point of thermoplastic composite material; and/or c4) using a heating fluid and/or of a heated mold in combination with a cooling fluid, a temperature of which is selected such that the sheet-like component and the hollow stiffening profile wall, only a side of the hollow stiffening profile wall that adjoins the sheet-like component, are heated above the melting point of thermoplastic composite material, and other sections of the hollow stiffening profiles remain at a temperature below the melting point of thermoplastic composite material; and/or c5) using a heating fluid and/or of a heated mold in combination with a cooling fluid, a temperature of which is selected such that the hollow stiffening profile wall and the sheet-like component can be coherently bonded to one another and/or other sections of the hollow stiffening profiles remain dimensionally stable and/or the hollow stiffening profiles remain airtight.

6. The process according to claim 1, wherein step c) comprises:

c7) generating a pressure $p_A$ in a range of about 2 to 40 bar, or about 8 to 12 bar, by generating pressure within the gastight container and/or by an external pressure-generation system; and/or c8) generating a superatmospheric pressure in the hollow stiffening profiles, where the hollow stiffening profile wall of the hollow stiffening profile or the covering layer of the closed omega stringers complies precisely with the desired surface shape of the aircraft component; and/or c9) generating a superatmospheric pressure in a gap optionally present between the cavities and the hollow stiffening profiles laid-up into the cavities.

7. The process according to claim 1, wherein cooling of the hollow stiffening profiles in step c) comprises one, a plurality or all of steps of:

c10) introducing heating fluid from the gastight container into a fluid line A configured in the male mold and equipped with a fluid cooling unit A for cooling of the heating fluid, and introducing the resultant cooling fluid into the enclosed space in the hollow stiffening profiles;

c11) conducting heating fluid out of the gastight container into an external fluid line B equipped with a fluid cooling unit B for cooling of the heating fluid, and introducing the resultant cooling fluid into the gastight container and then into the enclosed space in the hollow stiffening profiles;

c12) producing pressurized cooling fluid outside of the gastight container in a separate pressure-generation system and/or by a pump, and introducing the cooling fluid through a fluid line C into the gastight container and then into the enclosed space in the hollow stiffening profiles; and/or c13) using a cooled insulated flexible or inflexible tube for introduction of the pressurized cooling fluid into the enclosed space; and/or c14) introducing the pressurized cooling fluid into the enclosed space through a terminal aperture of the hollow stiffening profiles and/or through one or more apertures in a web of the closed omega stringers, with use of an inlet valve; and/or c15) cooling, by a fluid cooling unit C within the gastight container, of the cooling fluid introduced from outside of the gastight container; and/or c16) introducing pressurized cooling fluid in the gap optionally present between the cavities and the hollow stiffening profiles laid-up into the cavities.

8. The process according to claim 1, wherein step d) comprises one, a plurality or all of steps of:

d1) cooling of the arrangement by allowing cooling in contact with the ambient air; and/or d2) cooling of the arrangement by active cooling with a cooling medium; and/or d3) cooling by active cooling and/or allowing cooling of the arrangement with maintenance of the joining pressure prevailing in the gastight container until temperature of the arrangement is below temperature required for the cohesive bond, and/or below long-term service temperature, and/or below the heat-distortion temperature, and/or below the glass transition temperature of thermoplastic composite material.

9. The process according to claim 1, wherein the hollow stiffening profiles in the cavities of the mold are cooled by a cooling medium which flows through the hollow-stiffening-profile-cooling unit configured adjacent to the cavities in the mold.

10. The process according to claim 1, wherein a vacuum foil is laid-up on the arrangement made of hollow stiffening profiles and of sheet-like component, and then a vacuum is generated between the vacuum foil and the surface of the mold and/or the surface of the sheet-like component and/or the surface of the hollow stiffening profiles.

11. A device for producing a stiffened sheet-like component based on polymer for use in aircraft construction and comprising:

a) a male mold or a female mold, with a surface for arrangement of hollow stiffening profiles and of a sheet-like component, where these comprise a thermoplastic composite material; and/or b) a mold equipped with a heating device for heating the arrangement made of hollow stiffening profiles and of sheet-like component;

c) a gastight container for heating the arrangement made of hollow stiffening profiles and of sheet-like component under superatmospheric pressure;

d) cooling equipment comprising for cooling the hollow stiffening profiles and comprising:

within the male mold, a fluid line A which connects a space within the gastight container to the enclosed space in the hollow stiffening profiles and is equipped with a fluid cooling unit A, for introduction and cooling of heating fluid and for conducting resultant cooling fluid onwards into the enclosed space of the hollow stiffening profiles; and/or a fluid line B which leads out of the gastight container and is equipped with a fluid cooling unit B, for extraction and cooling of heating fluid, and a line for return into the gastight container for introducing the resultant cooling fluid into the enclosed space in the hollow stiffening profiles; and/or an external pressure-generation device or pump, for providing pressurized cooling fluid outside of the gastight container, and a fluid line C for introducing the resultant cooling fluid into the enclosed space of the hollow stiffening profiles; and/or a fluid cooling unit C within the gastight container for cooling of the cooling fluid introduced by the fluid line B and, respectively, the fluid line C.

12. The device according to claim 11, wherein the male mold or the female mold comprises:

cavities to receive the hollow stiffening profiles;

cavities to receive the hollow stiffening profiles with, configured to adjoin the same within the mold, cooling unit for cooling of the hollow stiffening profiles by a cooling fluid; and/or cavities to receive the hollow stiffening profiles, a surface of which has been coated with insulation or insulation comprising polytetrafluoroethylene or ceramic, for thermal insulation of the space within the cavities of the mold; and heating equipment for heating of the arrangement made of hollow stiffening profiles and of sheet-like component in a region of contact between the sheet-like component and the hollow stiffening profile wall, the heating equipment being configured in the male mold or the female mold and adjacent to the surface of the male mold or the female mold.

13. The process according to claim 3, wherein the polyaryletherketones comprise polyetherketoneketone, polyetherketone, polyetheretherketones, polyetheretheretherketone, polyetheretherketoneketone, and polyetherketoneetherketoneketone.

* * * * *